(12) United States Patent
Reitenbach et al.

(10) Patent No.: US 6,573,309 B1
(45) Date of Patent: Jun. 3, 2003

(54) HEAT-CURABLE, THERMALLY EXPANDABLE MOULDED PARK

(75) Inventors: Dirk Reitenbach, St. Leon-Rot (DE); Xaver Muenz, Heidelberg (DE)

(73) Assignee: Henkel Teroson GmbH, Heidelberg (DE)

(*) Notice: Subject to any disclaimer, the term of this patent is extended or adjusted under 35 U.S.C. 154(b) by 0 days.

(21) Appl. No.: 09/914,555

(22) PCT Filed: Feb. 23, 2000

(86) PCT No.: PCT/EP00/01474

§ 371 (c)(1),
(2), (4) Date: Aug. 31, 2001

(87) PCT Pub. No.: WO00/52086

PCT Pub. Date: Sep. 8, 2000

(30) Foreign Application Priority Data

Mar. 3, 1999 (DE) .......................................... 199 09 270

(51) Int. Cl.[7] .................................................. C08J 9/02
(52) U.S. Cl. ........................................ 521/135; 521/178
(58) Field of Search ................................. 521/135, 178

(56) References Cited

U.S. PATENT DOCUMENTS

| | | | |
|---|---|---|---|
| 3,837,981 A | 9/1974 | Flint ........................... 161/36 |
| 3,860,541 A | 1/1975 | Lehmann et al. .............. 260/18 |
| 3,982,819 A | 9/1976 | Letellier ...................... 260/836 |
| 4,000,097 A | 12/1976 | Chant et al. ............. 260/2.5 A |
| 4,090,986 A | * 5/1978 | Gormley et al. |
| 4,212,461 A | 7/1980 | Cecka et al. ............... 273/73 F |
| 4,390,615 A | 6/1983 | Courtney et al. ........... 430/315 |
| 4,595,623 A | 6/1986 | Du Pont et al. ............. 428/195 |
| 4,610,836 A | 9/1986 | Wycech ...................... 264/313 |
| 4,695,343 A | 9/1987 | Wycech ...................... 156/196 |
| 4,732,806 A | 3/1988 | Wycech ...................... 428/241 |
| 4,751,249 A | 6/1988 | Wycech ........................ 521/54 |
| 4,769,391 A | 9/1988 | Wycech ........................ 521/54 |
| 4,861,097 A | 8/1989 | Wycech ...................... 296/188 |
| 4,901,500 A | 2/1990 | Wycech ....................... 52/793 |
| 4,908,930 A | 3/1990 | Wycech .................... 29/527.2 |
| 4,978,562 A | 12/1990 | Wycech ..................... 428/35.8 |
| 4,995,545 A | 2/1991 | Wycech ...................... 228/119 |
| 5,084,532 A | 1/1992 | Schenkel .................... 525/524 |
| 5,124,186 A | 6/1992 | Wycech ..................... 428/35.8 |
| 5,274,006 A | 12/1993 | Kagoshima et al. .......... 521/85 |
| 5,453,453 A | 9/1995 | Lamon et al. ................. 521/54 |
| 5,470,886 A | 11/1995 | Makhlouf et al. ............. 521/59 |
| 5,512,372 A | 4/1996 | Blanc et al. ................. 428/413 |
| 5,575,526 A | 11/1996 | Wycech ...................... 296/205 |
| 5,712,317 A | 1/1998 | Makhlouf et al. ............. 521/76 |
| 5,755,486 A | 5/1998 | Wycech ...................... 296/188 |
| 5,804,608 A | 9/1998 | Nakazato et al. ............ 521/135 |
| 5,884,960 A | 3/1999 | Wycech .................... 296/146.6 |
| 5,888,600 A | 3/1999 | Wycech ..................... 428/35.9 |
| 5,996,167 A | 12/1999 | Close ....................... 15/230.12 |
| 6,015,865 A | 1/2000 | Blank et al. ................. 525/524 |
| 6,040,350 A | 3/2000 | Fukui ......................... 521/135 |
| 6,090,232 A | 7/2000 | Seeliger et al. ................ 156/79 |
| 6,094,798 A | 8/2000 | Seeliger et al. ............... 29/469 |
| 6,103,784 A | 8/2000 | Hilborn et al. .............. 523/219 |
| 6,348,513 B1 | 2/2002 | Hilborn et al. ................ 521/95 |
| 6,387,470 B1 | 5/2002 | Chang et al. ................ 428/121 |
| 6,403,668 B1 | 6/2002 | Yoshino ...................... 521/178 |

FOREIGN PATENT DOCUMENTS

| | | |
|---|---|---|
| AU | 645735 | 1/1994 |
| EP | 0 798 062 | 10/1997 |
| JP | 10140125 | 5/1998 |
| WO | WO86/00627 | 1/1986 |
| WO | WO89/08678 | 9/1989 |
| WO | WO93/00381 | 1/1993 |
| WO | WO93/05103 | 3/1993 |
| WO | WO95/21738 | 8/1995 |
| WO | WO96/37400 | 11/1996 |
| WO | WO97/19124 | 5/1997 |
| WO | WO98/15594 | 4/1998 |
| WO | WO98/52997 | 11/1998 |
| WO | WO00/27920 | 5/2000 |

OTHER PUBLICATIONS

Glycidated Polybutadiene Diols As Epoxy Resin Modifiers, No. 416, p. 5194, Research Disclosure, GB, Industrial Opportunities Ltd., Havant, Dec. 1998, XP000834080, ISSN:0374–4353.

* cited by examiner

*Primary Examiner*—Morton Foelak
(74) *Attorney, Agent, or Firm*—Stephen D. Harper

(57) ABSTRACT

Foamable compositions which exhibit reduced surface tack and better handling characteristics are obtained through the use of specific combinations of epoxy resins. One or more solid epoxy resins are utilized together with liquid and/or semi-solid epoxy resins. The compositions, which preferably contain hollow glass microspheres, are capable of providing foams which are useful in the manufacture of reinforced structural members.

31 Claims, No Drawings

HEAT-CURABLE, THERMALLY EXPANDABLE MOULDED PARK

This application claims priority from International application PCT/EP00/01474, filed Feb. 23, 2000, and German application DE 19909270.2, filed Mar. 3, 1999.

BACKGROUND OF THE INVENTION

1. Field of the Invention

The invention pertains to reduced tack foamable compositions based on epoxy resins. More specifically, particular combinations of epoxy resins containing solid epoxy resins are utilized to obtain putties which are sufficiently low in surface tackiness to be readily handled, yet are pliable enough to be shaped to conform to non-planar surfaces.

2. Discussion of the Related Art

It is known that a number of industries, e.g., the automobile industry, require parts that are both strong and lightweight. One attempt to achieve this balance between strength and minimal weight provides for hollow metal parts. However, hollow metal parts are easily distorted. Accordingly, it is also known that the presence of structural foam in the cavities of the hollow parts can improve the strength and stiffness of such parts.

Generally, such foams comprise a thermosettable resin such as an epoxy resin, a blowing agent and a filler. Preferably, these foams have a density of about 20–40 lb/ft$^3$ (about 0.30 to about 0.65 g/cc) and are able to withstand heat in excess of 175° C., more preferably in excess of 200° C. Optional ingredients include accelerators, curing agents, processing aids, stabilizers, colorants, and UV absorbers.

Specific formulas for structural foam vary widely and are widely found. For example, U.S. Pat. No. 5,575,526 teaches several resin-based structural foams including Formula 2, which contains 54.5% EPON 828 epoxy resin, 7.5% HALOXY 62 epoxy diluent, 6.1% DER 732 flexible epoxy, 2.0% EXPANCEL 551DU blowing agent, 8.8% MICROS microspheres, 17.7% 3M K20 microspheres and 3.4% DI-CY dicyandiamide curing agent. U.S. Pat. No. 5,755,486 discloses thermally expandable resin-based materials containing, for example, epoxy resin, acrylonitrile-butadiene rubber, calcium carbonate, carbon black, fumed silica, glass spheres, curing agent, accelerator, and blowing agent. Structural foams such as, e.g., Terocore® (a product of Henkel Surface Technologies), are now used in a variety of industries.

One recurrent problem with many of the structural foam formulations of this type that have been developed to date has been their relatively high degree of tack.

In many of the end-use applications in which structural foams are employed, a desired quantity of the structural foam in its uncured, unfoamed state must be placed on or near the surface of a metal part. Said surface may be somewhat difficult to access due to its proximity to other surfaces, thus often requiring the foamable composition to be applied manually. It will typically be desirable to have the foamable composition be sufficiently pliable or dough-like in consistency so that it may be easily shaped and otherwise manipulated to approximately follow the contours of the surface to which it is being applied.

Certain known structural foam formulations provide excellent strength and other physical properties when foamed and cured, yet are somewhat difficult to work with due to their pronounced "stickiness" prior to curing. The uncured formulation thus often does not separate cleanly from the hands or gloves of the operator who is applying the formulation to the structural member or the like into which the formulation is to be incorporated as a composite. A similar problem exists where tools or other machinery are utilized in the application of the foamable formulation. Residue from the uncured formulation consequently tends to build up on the application instruments being used, requiring periodic disposal or cleaning. Besides wasting a portion of the foamable formulation, productivity suffers due to the cleaning time required. It would therefore be very desirable to modify the properties of such foamable compositions in order to lower the surface tackiness, without significantly affecting either the pliability of the composition or its performance when foamed and cured.

SUMMARY OF THE INVENTION

It has now been surprisingly discovered that the excessive tackiness problems encountered in previously known structural foam formulations based on liquid and/or semi-solid epoxy resins may be effectively alleviated through the use of solid epoxy resins. The dough or putty thereby obtained may stil be easily formed into any desired configuration, yet leaves little or no residue on the instruments (e.g., hands, gloves, tools) used for such manipulation. Reduced tack foamable compositions thus are provided which comprise one or more base epoxy resins selected from the group consisting of liquid epoxy resins and semi-solid epoxy resins, one or more blowing agents, and one or more curatives, and an amount of one or more solid epoxy resins effective to reduce the surface tackiness of the foamable composition as compared to the surface tackiness of an analogeous foamable composition which does not contain any solid epoxy resin. Such compositions when foamed and cured furnish structural foams having excellent physical properties, including high strength and heat resistance.

DETAILED DESCRIPTION OF THE INVENTION

Preferred foam formulations contain about 35 weight percent to about 85 weight percent total of epoxy resins, about 5 weight percent to about 60 weight percent of fillers (preferably, including about 5 weight percent to about 50 weight percent hollow glass microspheres), about 0.1 weight percent to about 5 weight percent of one or more blowing agents, and about 0.1 weight percent to about 10 weight percent of one or more curatives. The foamable composition may also contain varying amounts of other additives such as blowing agent accelerators (activators), adhesion promoters (coupling agents), toughening/flexibilizing agents, thixotropic/rheological control agents, colorants and/or stabilizers. It is particularly advantageous to select formulation components which, when mixed together, provide a foamable dough of putty-like consistency which can be readily molded or shaped into any desired configuration prior to foaming and curing. At the same time, the dough should not exhibit a significant degree of cold flow. That is, the dough should essentially retain its shape over an extended period of time at ambient temperatures.

DETAILED DESCRIPTION OF THE INVENTION

Selection of the epoxy resins to be utilized is critical to the present invention. As a base epoxy resin, one or more liquid and/or semi-solid epoxy resins are employed. One or more solid epoxy resins are combined with the base epoxy resin to modify the surface tack of the foamable composition thereby obtained, as will be described in more detail hereinafter. Characterization herein of the physical form of a particular epoxy resin (i.e., "liquid", "semi-solid", "solid") is in reference to its form at approximately room temperature (i.e., about 25° C.). Semi-solid epoxy resins are those epoxy resins which are neither completely solid nor completely liquid at room temperature.

Generally speaking, epoxy resins are those thermosettable resins having an average of more than one (preferably, about two or more) epoxy groups per molecule.

Epoxy resins are well-known in the art and are described, for example, in the chapter entitled "Epoxy Resins" in the Second Edition of the *Encyclopedia of Polymer Science and Engineering*, Volume 6, pp. 322–382 (1986). Exemplary epoxy resins include polyglycidyl ethers obtained by reacting polyhydric phenols such as bisphenol A, bisphenol F, bisphenol AD, catechol, or resorcinol, or polyhydric aliphatic alcohols such as glycerin, sorbitol, pentaerythritol, trime thylol propane and polyalkylene glycols with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins.

Preferably, both the base epoxy resin(s) and the solid epoxy resin(s) are glycidyl ethers of polyhydric phenols (with bisphenol A being a particularly preferred polyhydric phenol) containing an average of about 2 epoxy groups per molecule. It is desirable to use base epoxy resins having epoxide equivalent weights in the range of from about 150 to about 350 (more preferably, about 170 to about 300). The solid epoxy resins, on the other hand, preferably have melting points in the range of from about 40° C. to about 150° C. (more preferably, about 50° C. to about 100° C.) and epoxide equivalent weights in the range of from about 350 to about 2000 (more preferably, about 375 to about 600). Numerous epoxy resins meeting these requirements are available from commercial sources. Representative commercial resins suitable for use as the base epoxy resin molecule include, but are not limited to, PEP 6134 (available from Peninsula Polymers) and EPON 834 (available from Shell Chemical). Representative commercial resins suitable for use as the solid epoxy resin component include, but are not limited to, ARALDITE CT 6060 (available from Ciba) and EPON 1001 (available from Shell Chemical).

Sufficient solid epoxy resin should be incorporated into the foamable composition so as to impart the desired degree of surface tack to said composition. The optimum surface tack will, of course, vary somewhat depending upon the particular end-use application and conditions under which the foamable composition is to be handled. Generally speaking, however, it will be desirable to add an amount of solid epoxy resin so as to obtain a dough which when manipulated at a temperature of from about 20° C. to about 40° C. does not leave any residue on the instruments being used to manipulate the dough. At the same time, however, the use of excessive quantities of solid epoxy resin should be avoided as the pliability of the dough may be adversely affected (i.e., the dough may become too stiff to be readily formed into a desired shape prior to foaming and curing). Additionally, some degree of residual surface tack is often desirable in order that the foamable dough when placed in contact with a substrate surface does not readily separate from said surface while the substrate is being further handled prior to curing and foaming. Ideally, the surface tack is adjusted by varying the base epoxy resin: solid epoxy resin ratio to obtain a dough which adheres to a metal surface when pressed into place, yet is capable of being released from said surface without leaving any residue. The types and amounts of the other components of the foamable composition will of course also influence the ratio of base to solid epoxy resin used. For example, the presence of relatively high concentrations of solid fillers may reduce the quantity of solid epoxy resin necessary to achieve a satisfactory tack level. If diluents are incorporated in the foamable composition, then larger amounts of solid epoxy resin may have to be used than would be the case in the absence of the diluents.

The optimum proportions of base epoxy resin(s) to solid epoxy resin(s) will depend upon the particular end-use contemplated as well as the physical and chemical characteristics of the individual resins. For example, if an epoxy resin which is fully liquid at room temperature is selected for use as the base epoxy resin, a somewhat larger amount of a solid epoxy will need to be added to achieve a given level of surface tack than would be the case if a semi-solid epoxy resin were instead utilized as the base epoxy resin. Thus, generally speaking, greater quantities of a given solid epoxy resin will need to be used as the melting (solidification) point of the base epoxy resin decreases. If the solid epoxy resin has a relatively high melting point, then typically a smaller amount will need to be added as compared to a solid epoxy resin having a relatively low melting point.

In general, it has been found that a weight ratio of base epoxy resins to solid epoxy resins in the range of from about 10:1 to about 1:5 will often be suitable, subject to the considerations discussed in detail hereinabove.

The hardening of the thermosettable epoxy utilized in the present invention may be accomplished by the addition of any chemical materials known in the art for curing such resins. Such materials are referred to herein as "curatives", but also include the substances known to workers in the field as curing agents, hardeners, activators, catalysts or accelerators. While certain curatives promote epoxy resin curing by catalytic action, others participate directly in the invention of the resin and are incorporated into the thermoset polymeric network formed by condensation, chain-extension and/or crosslinking of the epoxy resins.

It is particularly desirable to employ at least one curative which is a nitrogen-containing compound. Such curatives (along with other curatives useful for hardening epoxy resins) are described in the chapter in the *Encyclopedia of Polymer Science and Engineering* referenced herein. Suitable nitrogen-containing compounds useful as curatives include, amino compounds, amine salts, and quaternary ammonium compounds. Particularly preferred types of nitrogen-containing compounds include amine-epoxy adducts and guanidines. In one desirable embodiment of the invention, two or more different types of these nitrogen-containing compounds are used in combination.

Amine-epoxy adducts are well-known in the art and are described, for example, in U.S. Pat. Nos. 3,756,984, 4,066, 625, 4,268,656, 4,360,649, 4,542,202, 4,546,155, 5,134,239, 5,407,978, 5,543,486, 5,548,058, 5,430,112, 5,464,910, 5,439,977, 5,717,011, 5,733,954, 5,789,498, 5,798,399 and 5,801,218, each of which is incorporated herein by reference in its entirety.

Such amine-epoxy adducts are the products of the reaction between one or more amine compounds and one or more epoxy compounds. Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted. Preferably, the adduct is a solid which is insoluble in the epoxy resin component of the present invention at room temperature, but which becomes soluble and functions as an accelerator to increase the cure rate upon heating. While any type of amine could be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material for the adduct, including monofunctional, bifunctional, and polyfunctional epoxy compounds such as those described previously with regard to the epoxy resin component. Suitable amine-epoxy adducts are available from commercial sources such as Ajinomoto, Inc., Shell, Pacific Anchor Chemical Company, and the Asahi Chemical Industry Company Limited. The products sold by Ajinomoto under the trademark "AJICURE PN40" and "AJICURE-PN-23" are especially preferred for use in the present invention.

Dicyandiamide (sold commercially by Air Products under the trademark "DICY") is also a particularly preferred curative, although other guanidine compounds may also be utilized. The curative system may also compare one or more ureas, either above or in combination with other types of curatives (especially guanidines such as dicyandiamide). Suitable ureas include alkyl and aryl substituted ureas. Many such ureas are available commercially, for example, N,N'-dimethyl urea, which is sold under the trademark "AMICURE UR" by Air Products. Imidazoles such as 2-ethy-4methyl imidazole may also be used as curatives.

The curative system (i.e., the specific curatives and the amounts of such curatives) should be selected such that it does not catalyze curing of the foamable composition to any significant extent under typical storage conditions over an extended period of time. Preferably, the components of the curative system are adjusted such that the foamable composition retains a workable consistency (in one embodiment of the invention, a consistency resembling that of a pliable dough or putty) for more than two weeks in storage at 130 F (54° C.) and does not expand in volume or decrease in specific gravity under such conditions to an unacceptable extent, yet foams and cures within 10 minutes upon being heated at 150° C. or higher to provide a foam comparable in properties to those of a foam obtained from a freshly prepared foamable composition.

Selection of the blowing agent or blowing agents to be used in the present invention is not believed to be particularly critical, although chemical blowing agents in general are preferred over physical blowing agents. Any of the chemical blowing agents known in the art may be employed, with azodicarbonamide (also sometimes referred to as 1,1'-azobisformamide, AZDC, or ADC) and sulfonyl hydrazides providing particular good performance. Azodicarbonamide is available from a number of commercial sources; for example, it is sold under the trademark UNICELL by Doug Jin Chemical of South Korea and under the CELOGEN trademark by Uniroyal Chemical. "Activated" or "modified" forms of azodiacarbonamide may be used to advantage. In some formulations, it may be desirable to also use a blowing agent accelerator (activator) such as a urea so as to lower the temperature at which release of the gas from the blowing agent takes place. Typically, about 0.05% to about 2% blowing agent accelerator based on the weight of the foamable composition is employed, although the optimum amount will, of course, vary depending upon the accelerator selected, the amount of blowing agent, cure temperature and other variables. Excess accelerator should not be present in the foamable composition, however, since the storage stability may be undesirably compromised.

It will be especially desirable to include one or more glass fillers in the foamable composition, as such fillers have been found to impart useful characteristics to the resulting foam (especially where it is to be used to reinforce a structural member). For example, hollow glass microspheres may be added to reduce the density of the foam and thus the overall weight of the reinforced structural member while maintaining good stiffness and strength. Commercially available glass microspheres (sometimes also referred to as glass microballoons or microbubbles) include the materials sold by Minnesota Mining and Manufacturing under the trademark SCOTCHLITE, with suitable grades including those sold under the designations B38, C15, K20 and VS 5500. The glass microspheres preferably have diameters in the range of from about 5 to about 200 micrometers (preferably, less than about 70 micrometers). The crush strength of the hollow glass microspheres may be selected in accordance with the desired characteristics of the cured thermoset foam or reinforced structural member containing said foam. Microspheres having a crush strength in excess of 500 psi are typically employed, however. Glass fiber is another preferred type of glass filler, since it helps increase the strength and stiffness of the resulting foam. The glass fiber may be chopped, milled or in other physical forms.

Other types of fillers (which includes substances capable of functioning as thixotropic or rheological control agents) may also be optionally present in the foamable composition. Any of the conventional inorganic or organic fillers known in the thermosettable resin art may be used including, for example, fibers other than glass fibers (e.g. wollastinite fibers, carbon fibers, ceramic fibers, aramid fibers), silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), alumina, clays, sand, metals (e.g., aluminum powder), microspheres other than glass microspheres (including thermoplastic resin, ceramic and carbon microspheres, which may be solid or hollow, expanded or expandable), and any of the other organic or inorganic fillers known in the epoxy resin field. The quantity of thixotropic agent(s) is desirably adjusted so as to provide a dough which does not exhibit any tendency to flow at room temperature.

Other optional components include diluents (reactive or non-reactive) such as glycidyl ethers, glycidyl esters, acrylics, solvents, and plasticizers, toughening agents and flexibilizers (e.g., aliphatic diepoxides, polyaminoamides, liquid polysulfide polymers, rubbers including liquid nitrile rubbers such as butadiene-acrylonitrile copolymers, which may be functionalized with carboxyl groups, amine groups or the like), adhesion promoters (also known as wetting or coupling agents; e.g., silanes, titanates, zirconates), colorants (e.g., dyes and pigments such as carbon black), stabilizers (e.g., antioxidants, UV stabilizers), and the like.

The formulations of the present invention preferably contain the above-discussed components in the following amounts (expressed as a percentage of the total weight of the foamable composition).

| Component | Preferred | More Preferred |
| --- | --- | --- |
| Total Epoxy Resin(s) | about 35–85 | about 40–70 |
| Base Epoxy Resin(s) | about 5–80 | about 10–60 |
| Solid Epoxy Resin(s) | about 5–80 | about 10–60 |
| Blowing Agent(s) | about 0.1–5 | about 0.5–3 |
| Curative(s) | about 0.1–10 | about 1–8 |
| Filler(s) | about 5–60 | about 20–45 |
| Adhesion Promoter(s) | up to about 2 | about 0.001–0.5 |
| Colorant(s) | up to about 2 | about 0.01–1 |
| Toughening/Flexibilizing Agent(s) | up to about 15 | about 0.5–10 |
| Blowing Agent Accelerator(s) | up to about 3 | about 0.05–2 |
| Stabilizer(s) | up to about 2 | about 0.01–1 |

Preferably, epoxy resin is present in an amount which is greater than the amount of any of the other components in the foamable composition.

The above-described ingredients may simply be combined and mixed to form the foamable composition using any of the processing methods known in the epoxy resin art. It may be desirable to pre-mix the individual epoxy resins (i.e., the base epoxy resin(s) and solid epoxy resin(s)) before combining with the other components of the formulation.

The preferred finished product preferably has the consistency of dough for easier handling. The dough may be shaped by extrusion, by hand, or by cutting means into any desired configuration, thickness or size. For example, the dough may be extruded to a wide, flat continuous ribbon which can then be cut to a desired length and applied to the surface of a solid article, being conformed to follow the contours of said surface. The dough can then be cured and foamed by heating, preferably at a temperature of at least about 250° F. (about 120° C.), more preferably to at least about 300° F. (about 150° C.). Preferably, it is placed on or near the surface of a solid article comprised of, for example, metal or a thermoset or thermoplastic polymer such that a composite of the structural foam adhered to said surface is created upon foaming and curing. The foamable compositions of this invention are also useful for forming laminates, wherein the foamable composition is sandwiched between layers of different substrates (metal or plastic sheets or films, for example) Alternatively, of course, the dough can be placed in a suitable container or vessel for storage until the use of the foamable composition is desired.

The foamable compositions of the present invention may be utilized in any end-use application where a relatively light-weight, yet strong, thermoset foam is needed. However, the foamable compositions are especially useful in the production of automobiles and other vehicles to maintain or increase the strength of structural members such as rockers, pillars, radiator support beams, doors, reinforcing beams, and the like. The use of structural foams in such applications is described, for example, in U.S. Pat. Nos. 4,901,500; 4,908,930; 4,751,249; 4,978,562; 4,995,545; 5,124,186; 5,575,526; 5,755,486; 5,884,960; 5,888,600; 4,923,902; 4,922,596; 4,861,097; 4,732,806; 4,695,343; and 4,610,836 and European Patent Publication Nos. EP 0891918, EP 893331 and EP 0893332 and International Patent Publication Nos. WO 99/08854 (each of which is incorporated herein by reference in its entirety).

EXAMPLES

Examples 1–10

Foamable compositions in accordance with the present invention were prepared by combining the components listed in Table 1. The relative proportions of base epoxy resin to solid epoxy resin were varied to study the effect on surface tack of the resulting dough.

In Examples 1–3, tack was effectively reduced to an acceptable level but the degree of expansion observed upon heating and curing was somewhat low. In Examples 4–6, the amount of calcium carbonate, fumed silica and nitrile rubber were varied. Increasing the calcium cabonate levels generally resulted in a harder cured foam, while the degree of expansion was affected by the amount of fumed silica and nitrile rubber present. Flexibility was improved by the addition of nitrile rubber. Example 10 contained aluminum powder, which was added as a filler for the purpose of conducting heat through the foamable composition to allow for more even heat distribution and appropriate expansion of the composition.

Examples 11–21

Examples 11–21 illustrate various embodiments of the present invention wherein the ratio of base epoxy resin to solid epoxy resin was varied and different curative systems, coupling agents (adhesion promoters) and fillers evaluated.

To prepare the foamable dough of Example 11, the epoxy resins and flexibilizing/toughening agent were combined and mixed at low speed using a Ross double planetary mixer or Sigma blade mixer/extruder having a bowl temperature of 130° F. (54° C.). The calcium carbonate, fumed silica and colorant were thereafter added and mixed 10 minutes until uniformly incorporated. One-half of the hollow glass microspheres was added and mixed 10 minutes, following by the remaining amount of hollow glass microspheres. After mixing another 10 minutes, the remaining components were added and mixed for 5 minutes, scraping down the sides of the mixer periodically. A vacuum was then applied for 70 minutes to remove air from the dough obtained.

TABLE 1

| Component | Identity | Supplier | Ex. 1 Wt. % | Ex. 2 Wt. % | Ex. 3 Wt. % | Ex. 4 Wt. % | Ex. 5 Wt. % | Ex. 6 Wt. % | Ex. 7 Wt. % | Ex. 8 Wt. % | Ex. 9 Wt. % | Ex. 10 Wt. % |
| --- | --- | --- | --- | --- | --- | --- | --- | --- | --- | --- | --- | --- |
| Base Epoxy Resins | PEP 6134 | Peninsula Polymers | 45.96 | 37.34 | 28.73 | 43.09 | 38.50 | 40.25 | 40.72 | 37.82 | 37.53 | 36.75 |
| Solid Epoxy Resins | CT 6060 | Ciba | 11.49 | 20.10 | 28.73 | 14.33 | 20.73 | 17.24 | 17.24 | 20.36 | 20.21 | 19.79 |
| Curatives | | | | | | | | | | | | |
| Dicyandiamide | DICY G | Air Products | 4.33 | 4.33 | 4.33 | 4.33 | 4.46 | 4.33 | 4.38 | 4.38 | 4.33 | 4.26 |
| Urea | AJICURE UR | Air Products | 1.29 | 1.29 | 1.29 | 1.29 | 1.33 | 1.29 | 1.31 | 1.31 | 1.30 | 1.27 |
| Blowing Agent | CELOGEN OT | Uniroyal | 0.71 | 0.71 | 0.71 | — | — | — | — | — | — | — |
| | CELOGEN AZ 120 | Uniroyal | — | — | — | 0.71 | 0.73 | 0.71 | 0.72 | 0.72 | 0.72 | 0.80 |
| Fillers | | | | | | | | | | | | |
| Calcium Carbonate | ULTRA PFLEX | Specialty Chemicals | 5.81 | 5.81 | 5.81 | 5.80 | 4.95 | 4.80 | 5.37 | 5.37 | 5.81 | 5.22 |

TABLE 1-continued

| Component | Identity | Supplier | Ex. 1 Wt. % | Ex. 2 Wt. % | Ex. 3 Wt. % | Ex. 4 Wt. % | Ex. 5 Wt. % | Ex. 6 Wt. % | Ex. 7 Wt. % | Ex. 8 Wt. % | Ex. 9 Wt. % | Ex. 10 Wt. % |
|---|---|---|---|---|---|---|---|---|---|---|---|---|
| Fumed Silica | CAB-O-SIL T5720 | Cabot | 3.55 | 3.55 | 3.55 | 3.55 | 3.66 | 3.55 | 4.05 | 4.05 | 4.27 | 3.94 |
| Hollow Glass Microspheres | B-38 | 3M | 22.40 | 22.40 | 22.40 | 22.41 | 22.07 | 22.41 | 21.48 | 21.48 | 21.32 | 20.88 |
| Aluminium Powder | — | — | — | — | — | — | — | — | — | — | — | 2.71 |
| Toughening/ Flexibilizing Agent | NIPOL 1312 | Zeon | 4.33 | 4.33 | 4.33 | 4.33 | 3.43 | 4.33 | 4.37 | 4.38 | 4.35 | 4.26 |
| Colorant | MONARCH 120 | Cabot | 0.13 | 0.13 | 0.13 | 0.13 | 0.13 | 0.13 | 0.13 | 0.13 | 0.13 | 0.13 |
| Uncured Specific Gravity | | | — | — | — | — | — | — | 0.77 | 0.815 | — | — |
| Cured Specific Gravity | | | — | — | — | — | — | — | 0.51 | 0.523 | — | 0.52 |
| % Expansion | | | — | — | — | — | — | — | 54 | 52 | — | 60 |

TABLE 2

| Component | Identity | Supplier | Ex. 11 Wt. % | Ex. 12 Wt. % | Ex. 13 Wt. % | Ex. 14 Wt. % | Ex. 15 Wt. % | Ex. 16 Wt. % | Ex. 17 Wt. % | Ex. 18 Wt. % | Ex. 19 Wt. % | Ex. 20 Wt. % | Ex. 21 Wt. % |
|---|---|---|---|---|---|---|---|---|---|---|---|---|---|
| Base Epoxy Resins | PEP 6134 | Peninsula Polymers | 34.45 | 29.70 | 35.27 | 34.90 | 36.94 | 20.73 | 36.40 | 16.49 | 36.73 | 16.35 | 36.95 |
| Solid Epoxy Resins | CT 6060 | Ciba | 18.55 | 24.31 | 18.99 | 18.79 | 19.89 | 38.50 | 19.60 | 38.47 | 19.78 | 38.14 | 19.90 |
| Curatives | | | | | | | | | | | | | |
| Dicyandiamide | DICY CGNA | Air Products | 4.01 | 4.42 | 4.11 | 4.07 | 4.30 | — | — | — | 4.28 | — | 4.30 |
| | DICYANEX 200X | | — | — | — | — | — | 4.49 | 4.24 | 4.16 | — | 4.13 | — |
| Amine-Epoxy Adduct | AJICURE PR-23 | Ajinomoto | 1.01 | 1.13 | 1.04 | 1.03 | 1.09 | 1.13 | 1.07 | 1.05 | 1.08 | 1.04 | 1.09 |
| Amine | JEFFAMINE D-2000 | Texaco | — | — | — | — | — | 4.49 | 4.24 | 4.16 | 0.59 | 0.85 | — |
| Blowing Agents | CELOGEN OT | Uniroyal | 0.92 | 0.94 | 0.94 | 0.93 | 0.99 | 1.03 | 0.97 | 0.96 | 0.98 | 0.95 | 0.99 |
| | CELOGEN AZ 120 | Uniroyal | 0.92 | 0.94 | 0.94 | 0.93 | 0.99 | 1.03 | 0.97 | 0.96 | 0.98 | 0.95 | 0.99 |
| Fillers | | | | | | | | | | | | | |
| Calcium Carbonate | ULTRA PFLEX | | 4.43 | 4.51 | 4.53 | 4.49 | 4.75 | 4.43 | 4.68 | 4.11 | 4.72 | 4.08 | 4.75 |
| Fumed Silica | CAB-O-SIL T5720 | Cabot | 3.28 | 3.34 | 0.99 | 0.98 | 3.51 | 0.26 | 3.46 | 2.39 | 3.49 | 2.37 | 3.51 |
| Hollow Glass Micropheres | B-38/VS 5500 | 3M | 27.68 | 25.85 | 28.33 | 28.04 | 22.16 | 23.10 | 21.84 | 26.31 | 22.03 | 26.08 | 22.16 |
| Wollastanite | NYAD G | | — | — | — | 0.93 | — | — | — | — | — | — | — |
| Aluminium Powder | | | — | — | — | — | — | — | 1.46 | — | — | — | — |
| Toughening/ Flexibilizing Agent | NIPOL 1312 | Zeon | 4.00 | 4.07 | 4.09 | 4.05 | 4.28 | 4.46 | 4.22 | 4.14 | 4.26 | 4.11 | 4.28 |
| Coupling Agents | KEN-REACT KR-55 | Kenrich Petrochemicals | 0.09 | 0.09 | 0.09 | — | 0.40[1] | 0.10 | 0.39[2] | 0.10 | 0.10 | 0.09 | 0.10 |
| | A1120 | Witco | — | — | — | 0.09 | — | — | 0.19 | 0.10 | 0.19 | 0.10 | |
| Colorants | MONARCH 120 | Cabot | 0.12 | 0.12 | 0.12 | 0.12 | 0.13 | 0.13 | 0.13 | 0.12 | 0.13 | 0.12 | 0.13 |
| | 414 GREEN (phthalo-cyamine) | Akrochem | — | — | — | — | — | — | — | — | 0.18 | — | 0.18 |
| Blowing Agent Accelerator | BYK OT | Uniroyal | 0.53 | 0.59 | 0.54 | 0.54 | 0.57 | 0.59 | 0.56 | 0.55 | 0.57 | 0.55 | 0.57 |
| Uncured Specific Gravity | | | — | — | 0.725 | 0.710 | 0.79 | — | 0.79 | 0.79 | 0.796 | 0.782 | — |
| Cured Specific Gravity | | | — | — | 0.415 | 0.307 | 0.46 | — | 0.48 | 0.47 | 0.477 | 0.485 | — |
| % Expansion | | | — | — | 75 | 130 | 71 | — | 65 | 68 | 67 | 62 | — |
| Lap Shear, psi (#samples) | | | — | — | — | — | 915–984(3) | 510–595(3) | 930–958(3) | 723–851(5) | 641(1) | 897(1) | — |

[1]0.10 wt % KEN-REACT KR-55 titanate, 0.10 wt % KEN-REACT NZ37 zirconate, 0.20 wt % KEN-REACT 238M titanate
[2]0.10 wt % KEN-REACT KR-55 titanate, 0.10 wt % KEN-REACT NZ37 zirconate, 0.19 wt % KEN-REACT 238M titanate

What is claimed is:

1. A thermosetting, thermally-expandable molded body comprising:
   (a) at least one solid reactive resin selected from the group consisting of (i) solid polyglycidyl ethers of polyphenols, polyalcohols and diamines, (ii) solid polyglycidyl esters of polycarboxylic acids, and mixtures thereof,
   (b) at least one liquid reactive resin selected from the group consisting of (i) liquid polyglycidyl ethers of polyphenols, polyalcohols and diamines, (ii) liquid polyglycidyl esters of polycarboxylic acids, and mixtures thereof,
   (c) at least one reactive resin conferring flexibility selected from the group consisting of rubber-modified epoxy resins, polyurethane-modified epoxy resins, adducts of amino-terminated polyoxyalkylenes and polyepoxides, adducts of polymeric fatty acids and epichlorohydrin, glycidol, or diglycidyl ethers of bisphenol A, adducts of polyether polyols with epoxy resins, polymercaptan-modified epoxy resins, polysulfide-modified epoxy resins, and mixtures thereof,
   (d) at least one additive selected from the group consisting of latent hardeners and accelerators, and
   (e) at least one expanding agent.

2. A molded body as claimed in claim 1 wherein said molded body is not tacky at room temperature.

3. A molded body as claimed in claim 1 wherein the solid reactive resin (a) and the liquid reactive resin (b) are polyglycidyl ethers of bisphenol A.

4. A molded body as claimed in claim 1 wherein the solid reactive resin (a) has a melting point of from 45 to 90° C.

5. A molded body as claimed in claim 1 wherein the solid reactive resin (a) has an epoxy equivalent weight greater than 400.

6. A molded body as claimed in claim 1 wherein at least one reactive resin conferring flexibility is an adduct of at least one polymeric fatty acid and at least one diglycidyl ether of bisphenol A.

7. A molded body as claimed in claim 1 wherein there is used as the latent hardener dicyandiamide in an amount of up to 5 wt. %, based on the total composition.

8. A molded body as claimed in claim 1 additionally comprising one or more fillers, at least a part of the fillers being lightweight fillers selected from the group consisting of hollow glass spheres, flue ash, hollow plastic spheres, hollow ceramic spheres and organic lightweight fillers of natural origin.

9. A molded body as claimed in claim 1 wherein the expanding agent (e) is expandable hollow microspheres.

10. A molded body as claimed in claim 1 additionally comprising fibers selected from the group consisting of aramide fibers, carbon fibers, glass fibers, polyamide fibers, polyethylene fibers and polyester fibers.

11. A molded body comprising:
    (a) one or more solid epoxy resins selected from the group consisting of (i) solid polyglycidyl ethers of polyphenols, polyalcohols, and diamines, (ii) solid polyglycidyl esters of polycarboxylic acids, and mixtures thereof from 25 to 50 wt. %
    (b) one or more liquid epoxy resins selected from the group consisting of (i) liquid polyglycidyl ethers of polyphenols, polyalcohols, and diamines, (ii) liquid polyglycidyl esters of polycarboxylic acids, and mixtures thereof from 10 to 50 wt. %
    (c) one or more epoxy resins conferring flexibility selected from the group consisting of rubber-modified epoxy resins, polyurethane-modified epoxy resins, adducts of amino-terminated polyoxyalkylenes and polyepoxides, adducts of polymeric fatty acids and epichlorohydrin, glycidol, or diglycidyl ethers of bisphenol A, adducts of polyether polyols with epoxy resins, polymercaptan-modified epoxy resins, polysulfide-modified epoxy resins, and mixtures thereof from 1 to 25 wt. %

| | |
|---|---|
| (d) one or more additives selected from the group consisting of hardeners and accelerators | from 1.5 to 5 wt. % |
| (e) one or more expanding agents | from 0.5 to 5 wt. % |
| (f) one or more lightweight fillers | from 20 to 40 wt. % |
| (g) one or more fillers other than lightweight filler | from 5 to 20 wt. % |
| (h) one or more fibers | from 0.1 to 5 wt. % |
| (i) one or more pigments | from 0 to 1 wt. %, | the sum of all the constituents being 100 wt. %, wherein said molded body is non-tacky and dimensionally stable at room temperature.

12. A method of rigidifying and/or reinforcing a structure having a hollow space, said method comprising:
    (i) molding a mixture comprised of
       (a) at least one solid epoxy resin selected from the group consisting of solid polyglycidyl ethers of polyphenols, polyalcohols and diamines, solid polyglycidyl esters of polycarboxylic acids, and mixtures thereof;
       (b) at least one liquid epoxy resin selected from the group consisting of liquid polyglycidyl ethers of polyphenols, polyalcohols and diamines, liquid polyglycidyl esters of polycarboxylic acids, and mixtures thereof;
       (c) at least one reactive resin conferring flexibility selected from the group consisting of rubber-modified epoxy resins, polyurethane-modified epoxy resins, adducts of polymeric fatty acids and epichlorohydrin, glycidol, or diglycidyl ethers of bisphenol A, adducts of polyether polyols with epoxy resins, polymercaptan-modified epoxy resins, polysulfide-modified epoxy resins and mixtures thereof;
       (d) at least one additive selected from the group consisting of hardeners and accelerators; and
       (e) at least one expanding agent; at a temperature of 60° C. to 110° C. to form a molded body;
    (ii) cooling the molded body;
    (iii) introducing said molded body to said hollow space of said structure;
    (iv) heating said molded body to a temperature of from 110° C. to 200° C., whereupon the volume of the molded body expands and the molded body hardens to a thermoset.

13. A method as claimed in claim 12 wherein molding step (i) is carried out by injection molding.

14. A method as claimed in claim 12 wherein molding step (i) is carried out using a procedure selected from the group consisting of extruding, casting, compression molding, and stamping.

15. A method as claimed in claim 12 wherein said molded body expands in volume by from 50 to 100% during step (iv).

16. A method as claimed in claim 12 wherein the temperature in step (i) is from 70° C. to 90° C.

17. A method as claimed in claim 12 wherein the temperature in step (iv) is from 130° C. to 180° C.

18. A method as claimed in claim 12 wherein the molded body is softened by heating when introducing the molded body to the hollow space.

19. A method of rigidifying and/or reinforcing a substrate, said method comprising:

(i) molding a mixture comprised of
   (a) at least one solid epoxy resin selected from the group consisting of solid polyglycidyl ethers of polyphenols, polyalcohols and diamines, solid polyglycidyl esters of polycarboxlic acids, and mixtures thereof;
   (b) at least one liquid epoxy resin selected from the group consisting of liquid polyglycidyl ethers of polyphenols, polyalcohols and diamines, liquid polyglycidyl esters of polycarboxylic acids, and mixtures thereof;
   (c) at least one reactive resin conferring flexibility selected from the group consisting of rubber-modified epoxy resins, polyurethane-modified epoxy resins, adducts of amino-terminated polyoxyalkylenes and polyepoxides, adducts of polymeric fatty acids and epichlorohydrin, glycidol, or diglycidyl ethers of bisphenol A, adducts of polyether polyols with epoxy resins, polymercaptan-modified epoxy resins, polysulfide-modified epoxy resins and mixtures thereof;
   (d) at least one additive selected from the group consisting of hardeners and accelerators; and
   (e) at least one expanding agent; form a molded body;
(ii) cooling the molded body;
(iii) applying said molded body to said substrate; and
(iv) heating said molded body to a temperature of from 110° C. to 200 C., whereupon the volume of the molded body expands and the molded body hardens to a thermoset.

20. A method as claimed in claim 19 wherein molding step (i) is carried out by injection molding.

21. A method as claimed in claim 19 wherein molding step (i) is carried out using a procedure selected from the group consisting of extruding, casting, compression molding and stamping.

22. A method as claimed in claim 19 wherein said molded body expands in volume by from 50 to 100% during step (iv).

23. A method as claimed in claim 19 wherein the temperature in step (i) is from 70° C. to 90° C.

24. A method as claimed in claim 19 wherein the temperature in step (iv) is from 130° C. to 180° C.

25. A method as claimed in claim 19 wherein the molded body is softened by heating when applying the molded body to the substrate.

26. A thermosetting, thermally-expandable molded body which is dimensionally stable and not tacky at room temperature comprising:
   (a) at least one liquid epoxy resin which is a liquid polyglycidyl ether of a polyphenol and which has an epoxy equivalent weight of 150 to 480;
   (b) at least one solid epoxy resin which is a solid polyglycidyl ether of a polyphenol and which has a melting point of from 45° C. to 90° C.;
   (c) at least one reactive resin conferring flexibility selected from the group consisting of rubber-modified epoxy resins, polyurethane-modified epoxy resins, adducts of amino-terminated polyoxyalkylenes and polyepoxides, adducts of polymeric fatty acids and epichlorohydrin, glycidol, or diglycidyl ethers of bisphenol A, adducts of polyether polyols with epoxy resins, polysulfide-modified epoxy resins, polymercaptan-modified epoxy resins and mixtures thereof:
   (d) at least one latent hardener or accelerator selected from the group consisting of guanidines, substituted guanidines, substituted ureas, melamine resins, guanamine derivatives, cyclic tertiary amines, aromatic amines, imidazole derivatives, and mixtures thereof;
   (e) at least one expanding agent selected from the group consisting of azo compounds, hydrazides, and expandable hollow plastic microspheres; and
   (f) at least one light weight filler selected from the group consisting of hollow glass microspheres, flue ash, hollow plastic spheres, hollow ceramic spheres, organic lightweight fillers of natural origin, and mixtures thereof.

27. A molded body as claimed in claim 26 additionally comprising fibers selected from the group consisting of aramide fibers, carbon fibers, glass fibers, polyamide fibers, polyethylene fibers, polyester fibers and mixtures thereof.

28. A thermosetting, thermally-expandable molded body which is dimensionally stable and not tacky at room temperature comprising:
   (a) at leat one liquid epoxy resin obtained by reaction of bisphenol A and epichlorohydrin and having an epoxy equivalent weight of from 182 to 350;
   (b) at least one solid epoxy resin obtained by reaction of bisphenol A and epichlorohydrin and having a melting point from 50° C. to 80° C. and an epoxy equivalent weight of from 450 to 900;
   (c) at least one reactive resin conferring flexibility selected from the reaction products of polymeric fatty acids with diglycidyl ethers of bisphenol A;
   (d) at least one latent hardener or accelerator selected from substituted guanidines;
   (e) expandable plastic microspheres; and
   (f) hollow glass microspheres.

29. A molded body as claimed in claim 28 additionally comprising polyaramide fibers selected from the group consisting of polyaramide fibers, polyester fibers, and mixtures thereof.

30. A method of rigidifying and/or reinforcing a metal component, said method comprising applying a molded body which is non-tacky and dimensionally stable at room temperature and comprised of
   (a) at least one solid reactive resin selected from the group consisting of (i) solid polyglycidyl ethers of polyphenols, polyalcohols, and diamines, (ii) solid polyglycidyl esters of polycarboxylic acids, and mixtures thereof;
   (b) at least one liquid reactive resin selected from the group consisting of (i) liquid polyglycidyl ethers of polyphenols, polyalcohols, and diamines, (ii) liquid polyglycidyl esters of polycarboxylic acids, and mixtures thereof;
   (c) at least one reactive resin conferring flexibility selected from the group consisting of rubber-modified epoxy resins, polyurethane-modified epoxy resins, adducts of amino-terminated polyoxyalkylenes and polyepoxides, adducts of polymeric fatty acids and epichlorohydrin, glycidol, or diglycidyl ethers of bisphenol A, adducts of polyether polyols with epoxy resins, polymercaptan-modified epoxy resins, polysulfide-modified epoxy resins, and mixtures thereof;
   (d) at least one additive selected from the group consisting of hardeners and accelerators; and
   (e) at least one expanding agent,
   to said metal component and heating said molded body to a temperature effective to expand said molded body in volume and to harden said molded body to a thermoset.

31. A method claimed in claim 30 wherein said molded body is additionally comprised of fibers.

* * * * *

UNITED STATES PATENT AND TRADEMARK OFFICE
CERTIFICATE OF CORRECTION

PATENT NO. : 6,573,309 B1
DATED : June 3, 2003
INVENTOR(S) : Reitenbach et al.

It is certified that error appears in the above-identified patent and that said Letters Patent is hereby corrected as shown below:

Title page, Item [54] and Column 1, line 2,
Title, delete "PARK" and insert therefore -- PART --.

Title page,
Item [56], References Cited, OTHER PUBLICATIONS, delete "p. 5194" and insert therefore -- p. 1594 --.

Column 13,
Line 23, after "agent;" and before "form", insert -- to --.

Column 14,
Line 16, delete "leat" and insert therefore -- least --.

Signed and Sealed this

Fifth Day of April, 2005

JON W. DUDAS
*Director of the United States Patent and Trademark Office*